United States Patent [19]

Robinson et al.

[11] 4,270,421
[45] Jun. 2, 1981

[54] APPARATUS FOR CORRECTING PRECISION ERRORS IN SLIDE STRAIGHTNESS IN MACHINE TOOLS

[75] Inventors: Samuel C. Robinson, Clinton; Howard L. Gerth, Knoxville, both of Tenn.

[73] Assignee: The United States of America as represented by the United States Department of Energy, Washington, D.C.

[21] Appl. No.: 22,898

[22] Filed: Mar. 22, 1979

[51] Int. Cl.³ .............................................. B23B 21/00
[52] U.S. Cl. .................................... 82/21 A; 82/2 R; 82/24 R
[58] Field of Search ................... 82/2 R, 21 A, 24 R, 82/5, 34 R

[56] References Cited

U.S. PATENT DOCUMENTS

| 3,104,349 | 9/1963 | Stevens | 82/5 X |
|---|---|---|---|
| 3,130,617 | 4/1964 | De Valliere | 82/5 |
| 3,145,596 | 8/1964 | Brilliantine | 82/5 |
| 3,393,588 | 7/1968 | Broome | 82/2 R |
| 3,504,582 | 4/1970 | Klee et al. | 82/24 R |
| 3,596,546 | 8/1971 | Van Den Kieboom | 82/24 R |
| 3,677,115 | 7/1972 | Skrentner | 82/24 R |

Primary Examiner—Leonidas Vlachos
Attorney, Agent, or Firm—Earl L. Larcher; Stephen D. Hamel; James E. Denny

[57] ABSTRACT

The present invention is directed to a mechanism by which small deviations in slideway straightness and roll of a precision machining apparatus may be compensated for. The mechanism of the present invention comprises a fixture support disposed between the slideway carriage and the tool or workpiece fixture and provided with a hinge-like coupling between the carriage and the fixture support so as to allow for the minute and precise displacement of the fixture support in a direction normal to the direction of the slide path so as to readily compensate for slight deviations in the straightness and roll of the slide path.

4 Claims, 4 Drawing Figures

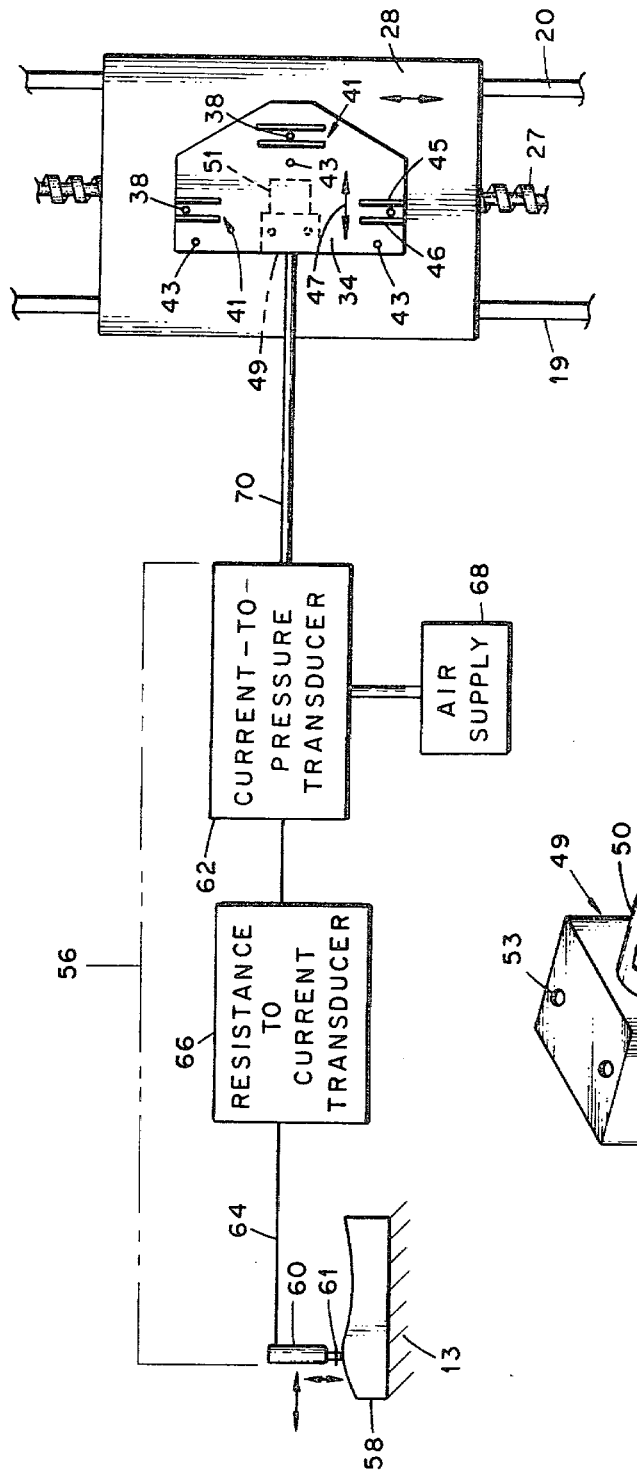

APPARATUS FOR CORRECTING PRECISION ERRORS IN SLIDE STRAIGHTNESS IN MACHINE TOOLS

BACKGROUND OF THE INVENTION

The present invention relates generally to machining apparatus, and more particularly to a system for compensating for slight variations in the straightness and roll of the tool path used on the machine. This invention was made in the course of, or under a contract with the United States Department of Energy.

Specification requirements for machined components used in many technological fields have become increasingly stringent and are often within tolerances of less than 100 microinches. Such machining frequently involves the use of a high precision, low vibration machine tool with diamond tooling. For example, diamond machined metal mirrors for reflecting laser beams in nuclear fusion systems require a reflective surface with a flatness deviation of less than 20 microinches. In order to maintain a 20-microinch mirror the slideway path straightness and/or roll error must be less than approximately 10 microinches. Most state of the art precision machines capable of such machining exhibit slideway straightness deviation of about 25–35 microinches and a flatness (vertical variation over the length of the slide causing roll of the workpiece or tool fixture) of about 10 to 20 microinches.

Several techniques for minimizing the effects of slideway straightness and/or roll have been used but have met with only limited success. For example, a previous approach was to use the slide positioning motor and lead screw disposed along one of the axes to make necessary corrections during machine operation. However, the friction in the slides and the small incremental movements required to correct for non-straightness and/or roll have caused this approach to have only limited success. Alternatively, reworking the slides to correct for errors in roll and straightness was found to be very time consuming and expensive, as well as requiring specialized personnel. Normally such reworking does provide slide straightness better than about 20 microinches but it was found that the slide straightness changed sufficiently with use as to necessitate frequent reworking.

BRIEF DESCRIPTION OF THE INVENTION

Accordingly, it is the primary aim or goal of the present invention to provide a system to compensate for machine errors, such as straightness and roll errors in machine slideways so that a tool path error of less than 10 microinches is present even though the actual slide straightness and roll may be considerably greater than 10 microinches. This goal is achieved by providing an improvement in a machining apparatus utilized to machine a workpiece of a desired configuration to within preselected tolerances. The improved machine includes a machine base carrying a spindle rotatable about an axis and adapted to support either the workpieces or the tool, elongated slide means supported by the machine base, fixture means carried by the slide means and adapted to support one of the workpieces or the tool, and moving means coupled to the fixture means for displacing the fixture means on the slide means along a preselected path. The improvement provided by the present invention comprises a "hinged" fixture supporting means disposed intermediate and coupled to the fixture means and the slide means. The hinge means in the fixture supporting means are disposed contiguous to the coupling with the slide means for providing movement of the fixture supporting means and the fixture means coupled thereto in a plane normal to the preselected path of the fixture means on the slide means. Suitable drive means are coupled to the fixture supporting means for displacing the latter along the plane a preselected distance in order to compensate for machine errors, such as slide straightness and roll.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for the purpose of illustration and description. The preferred embodiment illustrated is not intended to be exhaustive or to limit the invention to the precise form disclosed. It is chosen and described in order to best explain the principles of the invention and their application in practical use to thereby enable others skilled in the art to best utilize the invention in various embodiments and modifications as are best adapted to the particular use contemplated. While the machine described herein is directed primarily to a lathe-type machine, it will appear clear that the invention may be utilized in any machine in which a slideway is employed, such as with a flycutter or boring bar in which the cutting or grinding of a workpiece is required.

DETAILED DESCRIPTION OF THE DRAWINGS

FIG. 3 is a schematic plan view showing details of the hinged fixture supporting means of the present invention; and FIG. 4 is a perspective view showing a pneumatic cylinder which may be utilized to displace the hinged fixture of the present invention in microinch increments.

DETAILED DESCRIPTION OF THE INVENTION

Figure 1:
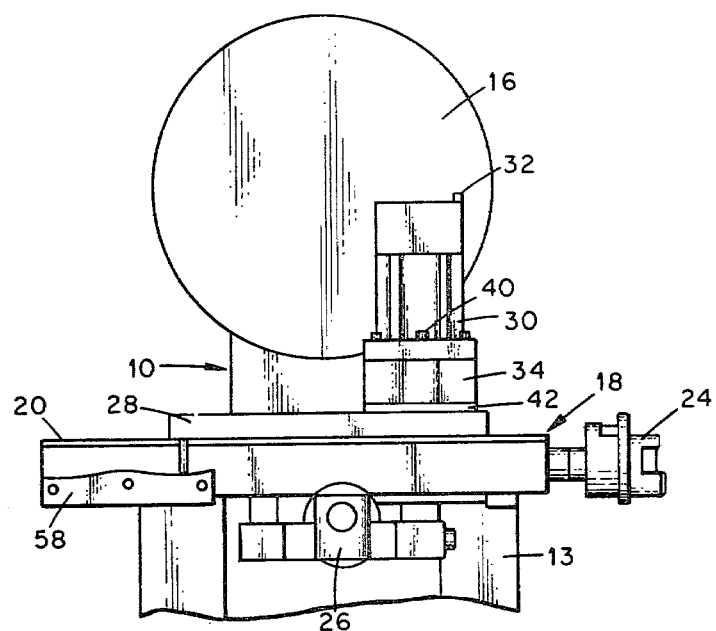
FIG. 1 is a front elevational view showing a lathe-type machine in which the present invention may be utilized.
Figure 2:
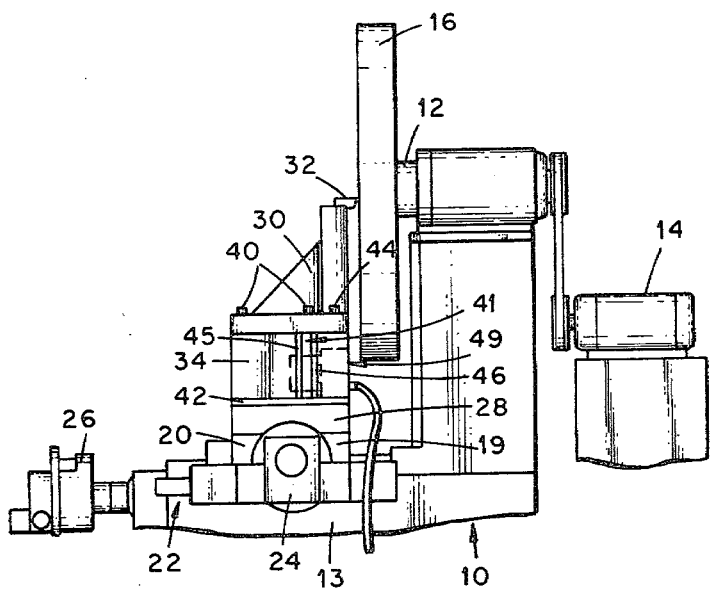
FIG. 2 is a side elevation view of the FIG. 1 machine showing further details of the present invention.

With reference to the accompanying drawings, the present invention is shown utilized on a lathe-type machine tool generally shown at 10 which comprises a spindle 12 supported by a machine base 13, a spindle drive 14 and a workpiece 16 which is supported by a suitable chuck (not shown) on the spindle 12 for rotation about an axis. The machine base 13 supports a slideway 18 which conventionally comprises a pair of laterally spaced-apart parallel rails 19 and 20 extending over a fixed length along a particular plane, such as the "X" axis. The machine 10 may also include a slideway 22 disposed along the "Y" axis which is perpendicular to the plane of the "X" axis slideway 18. The slideways 18 and 22, respectively, include slide drives 24 and 26 which move appropriate fixture means along the slideways by lead screws, such as generally shown at 27. The "X" slideway 18 is provided with a carriage 28 which is displaceable along the slideway 18 and supports a tool fixture 30 in which a tool 32 is mounted for performing the desired machining function upon the workpiece 16.

The present invention is a unique "hinged" support 34 for the tool fixture 30 that is machined from a single massive piece of metal, such as aluminum or any other metal having similar resilient properties. This fixture support 34 is provided with a plurality of bores 38 (three shown) through which bolts 40 secure the fixture support to the slide carriage 28 in a rigid manner at a location contiguous to the "hinge" 41. A plate or spacer 42 of a configuration generally corresponding to that of the fixture support 34 is disposed between the fixture support 34 and the slide carriage 28 for facilitating the displacement of the fixture support 34 along the side base carriage a direction normal to the movement of the slide carriage on the slideway 18, as will be described in greater detail below. The fixture support 34 is also bolted to the tool fixture 30 by employing a plurality of bores 43 (three shown) for bolts 44 to rigidly couple the fixture support 34 to the tool fixture 30.

In accordance with the present invention a flexible or hinged coupling is provided in the fixture support 34 contiguous to each of the couplings with the carriage 28 so that the displacement of the fixture support 34 through this hinged coupling provides for the displacement of the fixture support 34 and the tool fixture 30 attached thereto along a path normal to the direction of the slide carriage 28 along the slideway 18. Each of the hinged couplings 41 of the present invention is provided by a pair of machined parallel slots 45 and 46 which project through the thickness of the fixture support 34 and co-extend a preselected distance in the support so as to provide a cantilever beam-type mount between the fixture support 34 and the tool carriage 28. These slots extend in a plane parallel to the slides 19 and 20. The thickness of the metal remaining between the parallel slots 45 and 46 is predetermined so that a preselected force upon the fixture support 34 in a direction perpendicular to the longitudinal length of the slots as indicated by the arrow 47 (FIG. 3) will bend or flex the metal between the slots 45 and 46 at a location contiguous to the base or distal ends of the slots so as to provide the hinging action. For example, in accordance with the present invention, the three pairs of elongated slots contiguous to the bores 38 as shown in FIG. 3 can be provided with a sufficient thickness of metal between each pair of slots so that a force corresponding to about one pound per square inch bearing against the fixture support in either of the directions indicated by the arrow 47 will displace the fixture support 34 and the tool fixture 30 attached thereto one microinch. Of course, the thickness of the metal between the slots depends upon the type of metal being used for the fixture support 34 as well as the desired displacement in response to a predetermined force. Also, the thickness of the metal between the slots 45 and 46 in the hinge 41 where both ends of the slots terminate within the fixture support 34 will be thinner than the metal between the slots where only one end of the slots terminates within the metal since both such ends of the slots will function as a hinge.

In order to provide for the selected incremental displacement of the fixture support 34 through the hinged coupling 41 to compensate for the slideway straightness and flatness a drive means generally at 49 may be utilized. This drive means 49 comprises a pneumatic cylinder 50 which may be disposed in a generally T-shaped cavity 51 machined with the fixture support 34. The pneumatic cylinder comprises a hollow body portion 52 which is rigidly bolted to the slide carriage 28 by bolts (not shown) through bores 53 and a hollow tubular head or piston 54 integral with the body portion 52. The cylinder 50 is preferably machined from a single mass of metal so as to possess no moving parts and which exhibits limited elongation or retraction of the piston 54 when an internal pressure is exerted upon or removed from the face of the piston due to the tensile stress set up in the walls of the piston 54. By using a cylinder of one-piece construction, microinch elongation or retraction of the cylinder head 54 may be achieved without friction, stick-slip or hysteresis which might be present in other pneumatic cylinder designs. The pneumatic cylinder 50 may be machined from stainless steel and provided with a predetermined wall thickness which will permit elongation of the piston a distance of one microinch for each square inch pressure applied to the cylinder cavity.

To provide the displacement of the fixture support 34 by the pneumatic cylinder 50 a slide straightness and flatness error correction system 56 (FIG. 3) may be utilized. This system 56 is shown comprising a cam 58 attached to the machine base 13 and shaped or contoured to coincide with the tool path errors, such as straightness and roll variations in the slideway 20. This cam configuration can be predetermined by running the machine through a cycle and measuring the discrepancies in the workpiece as caused by errors in the machine. The contours on the cam are followed by a cam follower 60 which is attached to carriage 28 and comprises a linear resistor which upon the selected vertical displacement of a piston 61 therein in either direction provides an electrical signal indicative of the displacement to a current-to-pressure transducer generally shown at 62 via lead 64. This current-to-pressure transducer may be of any commercially available type capable of converting the signals to valve fluid pressure as small as one pound increments. A suitable power supply for powering the linear resistor 60 and the transducer 62 is generally shown as a resistance-to-current tranducer at 66. The transducer 62 is also coupled to an air supply 68 and the pneumatic cylinder 51 through a conduit system generally shown at 70.

In operation, after the cam contour is determined and machined, the cam 58 is attached to the machine base 13 and the machine 10 is operated to provide the desired machining operations. As this machining is initiated or prior thereto, a pressure preload in the order of about 25 psi is introduced in the pneumatic cylinder 50 so as to flex the hinge coupling a preselected distance. This initial setting may be readily compensated for in the machine program. As the machining operation proceeds the cam contour through the linear resistor 60 causes changes in the pressure within the cylinder 50 so as to compensate for the errors in slide straightness and flatness. By continually changing the pressure within the cylinder 50 as the fixture support 34 moves along a path parallel to the slideway 20 the tool fixture 30 is displaced a sufficient distance in a direction perpendicular to the carriage path on the slideway 28 to correct for errors in the machine, such as slide straightness and roll.

While the precise displacement of the fixture support 34 is shown being controlled by an error-compensating system in which cam 58 is utilized, it will appear clear that the fluid pressure to the cylinder may be readily regulated by utilizing a computer microprocessor or the like (not shown) for providing the desired signal to the transducer 62. Often such a microprocessor is utilized to provide the numerical control of the machine and can be readily programmed to incorporate a signal for the pressure transducer 62.

It will be seen that the present invention provides a novel error compensating system which will readily enable machining of workpieces with deviations of less than 20 microinches from desired specifications in a manner considerably simpler and more readily attainable than previously known techniques.

What is claimed is:

1. An improvement in a machining apparatus utilized to machine a workpiece into a desired product configuration wherein deviations in slideway straightness and roll are compensated for, comprising spindle means rotatable about an axis and adapted to support one of a workpiece and a machine tool, elongated slide means, carriage means on said slide means for displacement therealong, fixture means carried by said carriage means and adapted to support one of a workpiece and a machine tool, moving means coupled to said carriage means for effecting the displacement of the carriage means and the fixture means on said slide means along a preselected path, said improvement comprising fixture supporting means comprising a mass of metal disposed intermediate to and coupled to both said fixture means and said carriage means, hinge means in said fixture supporting means contiguous to the coupling with said carriage means for providing movement of said fixture supporting means and the fixture means coupled thereto in a plane normal to said preselected path, said hinge means comprising a pair of parallel elongated and coextensive slots extending through the thickness of the fixture supporting means and spaced from one another by a portion of said fixture supporting means, said fixture supporting means being coupled to said carriage means at said portion, and drive means coupled to said carriage means and contacting said fixture supporting means for displacing the latter along said plane a preselected distance by bending said portion adjacent to the distal ends of said slots.

2. The improvement in a machining apparatus as claimed in claim 1, wherein said fixture supporting means is coupled to said carriage means at a plurality of spaced-apart locations with each location being provided with a pair of said slots.

3. The improvement in a machining apparatus as claimed in claim 1, wherein said drive means comprises a fluid actuated cylinder having a piston thereof bearing against said fixture supporting means, valve means for conveying fluid at preselected pressures into or from said cylinder, and signal producing means for actuating said valve means.

4. The improvement in a machining apparatus as claimed in claim 3, wherein said signal producing means comprises a cam contoured to correspond to errors in at least one of the straightness and flatness of the slide means, a cam follower means follows said contour when said carriage is displaced along said path for providing a signal indicative of said error, and wherein said signal actuates said valve means.

* * * * *